J. C. MANTERNACH.
RIM FOR VEHICLE WHEELS.
APPLICATION FILED APR. 2, 1917.
1,288,950.
Patented Dec. 24, 1918.
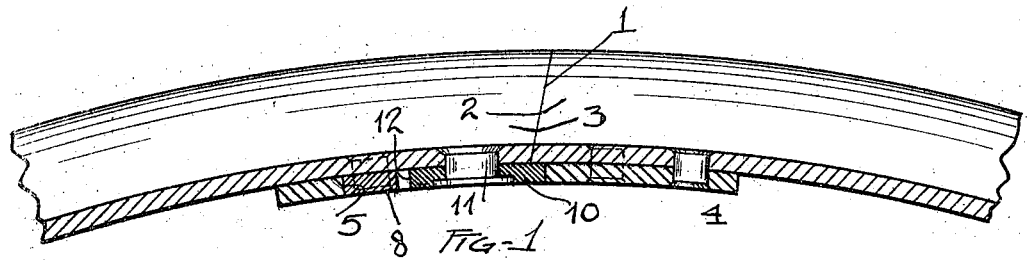
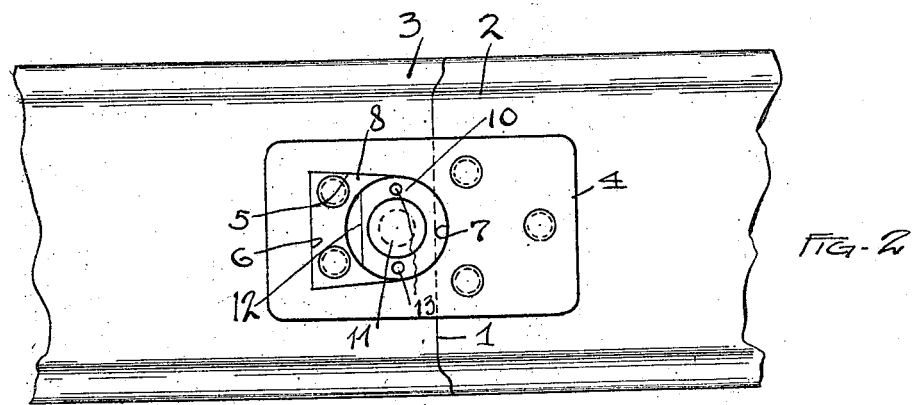
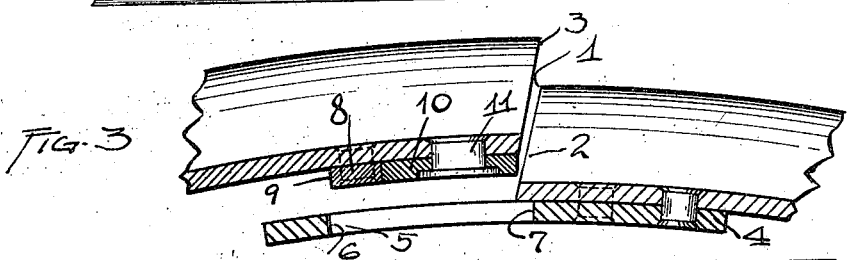
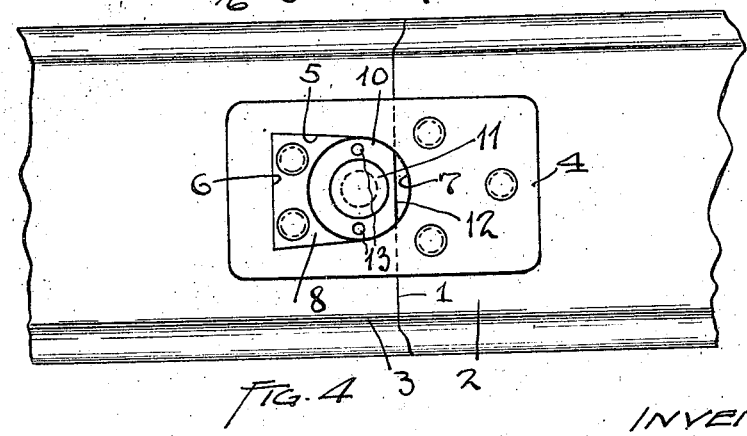
INVENTOR
John C. Manternach
BY Jay Oberlin & Jay
ATTORNEYS

UNITED STATES PATENT OFFICE.

JOHN C. MANTERNACH, OF CLEVELAND, OHIO, ASSIGNOR TO THE STANDARD PARTS COMPANY, OF CLEVELAND, OHIO, A CORPORATION OF OHIO.

RIM FOR VEHICLE-WHEELS.

1,288,950.

Specification of Letters Patent.

Patented Dec. 24, 1918.

Application filed April 2, 1917. Serial No. 159,113.

*To all whom it may concern:*

Be it known that I, JOHN C. MANTERNACH, a citizen of the United States, and a resident of Cleveland, county of Cuyahoga, and State of Ohio, have invented a new and useful Improvement in Rims for Vehicle-Wheels, of which the following is a specification, the principle of the invention being herein explained and the best mode in which I have contemplated applying that principle, so as to distinguish it from other inventions.

The present improvements relate more particularly to a demountable rim of the so-called transversely split type, that is to a rim in which the base is cut transversely across so as to adapt the rim to be collapsed by springing one end radially inwardly past the other, in order that the tire may be more readily placed on or taken off from such rim. This type of construction has become quite popular, the side flanges of the rim being almost invariably integral with the base, although such side flanges may be in the form of continuous rings separate from such base, but engaging therewith in the expanded condition of the same.

The object of the present invention is to provide an improved locking device for securing the ends of the rim or rim base in place; in other words, to prevent their separation both radially and laterally; and to this end said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a longitudinal section across the meeting ends of a trans-split rim showing in place thereon a locking device embodying my present improvements; Fig. 2 is an inside plan view of such meeting rim-ends and locking device, the latter being shown in its operative position in both the foregoing figures; Fig. 3 is a sectional view similar to Fig. 1, but showing the locking device in inoperative position and the rim-ends slightly separated; and Fig. 4 is a plan view of such rim-ends, likewise showing the locking device in inoperative position.

Preferably, as indicated more clearly in Figs. 1 and 3, the rim is split at right angles to its median line, with the plane of the split 1 inclining slightly to the radius. Accordingly radial separation of the ends will be prevented by the provision on the obtusely angled end 2 of a projection which overlaps the acutely angled end 3. The present locking device combines a movable projection, adapted to function in the fashion just stated, with a tongue and lug on the respective rim-ends adapted to interlock the same against relative lateral and longitudinal, *i. e.* circumferential displacement.

This tongue in the form illustrated in Figs. 2 and 4, consists of an oblong plate 4 firmly riveted, welded, or otherwise attached to the inner face of the obtusely angled rim-end 2 and projecting some distance beyond the split 1 so as to correspondingly underlie the opposite rim-end 3. Such overlying portion of the tongue is formed with an aperture 5, preferably of the shape illustrated in the same figures, viz., with a transverse wall 6 nearest the outer or free end of the tongue, and with a semi-circular wall 7 nearest the inner or attached end of such tongue.

Firmly riveted to the opposed rim end, so as to register with such aperture 5, when the two rim ends are properly alined, is a lug of complementary form, such lug including a fixed portion 8 having a transverse face 9 adapted to engage the transverse wall 6 of the aperture, and a movable portion in the form of a rotable disk 10 held in place by means of a shouldered pin 11, such disk fitting against the curved wall 7 of the aperture. This end of the aperture extends beyond the line of junction between the rim-ends when the latter are juxtaposed, and accordingly the disk is adapted to overlie the acutely angled rim end, and thus lock the rim-ends against radial displacement in the fashion previously explained. One side of such disk, however, is cut away as at 12, so that, when this cut-away portion is disposed toward the rim-end in question, such rim-end is free to be radially displaced relatively to the other. The disk may be rotated into either its operative or inoperative position by pressing with a screw-driver or like implement against the cut-away portion 12 thereof, or apertures 13, formed in its face, may be engaged by a spanner or like instrument.

It will be understood that the engagement between the side walls of the aperture 5 in the tongue with the sides of the fixed portion 8 of the lug, securely hold the rim-ends against lateral displacement, while the engagement between the transverse wall 6 of the aperture and the corresponding face 9 of such lug prevents longitudinal separation of the rim-ends. Combining with the foregoing the action of the movable portion 10 of the lug, which directly engages with the acutely angled rim end, it will be seen that the foregoing locking device is adapted to secure the rim ends against any possible displacement. This is true whether a tire is in place on the rim in inflated or deflated condition, and is equally true whether the rim be mounted upon a wheel or carried as a spare.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A device of the character described, comprising a transversely split rim; a member projecting beyond one end of said rim, said member and the other end of said rim being provided with inter-engaging elements adapted to prevent circumferential displacement of such ends; and a latch movably attached to such other rim-end adapted in one position to engage directly with such first rim-end to prevent radial displacement thereof.

2. A device of the character described, comprising a transversely split rim; a member projecting beyond one end of said rim, said member and the other end of said rim being provided with inter-engaging elements adapted to prevent lateral displacement of such ends; and a latch movably attached to such other rim-end adapted in one position to engage directly with such first rim-end to prevent radial displacement thereof.

3. A device of the character described, comprising a transversely split rim; a member projecting beyond one end of said rim, said member and the other end of said rim being provided with inter-engaging elements adapted to prevent lateral and circumferential displacement of such ends; and a latch movably attached to such other rim-end adapted in one position to engage directly with such first rim end to prevent radial displacement thereof.

4. A device of the character described, comprising a transversely split rim; a member projecting beyond one end of said rim, said member and the other end of said rim being provided with inter-engaging elements adapted to prevent lateral and circumferential displacement of such ends; and a latch pivotally attached to such other rim-end adapted in one position to engage directly with such first rim end to prevent radial displacement thereof.

5. A device of the character described, comprising a transversely split-rim; an apertured member projecting beyond one end of said rim so as to over-lie the other end thereof; a lug on such other end adapted to register with the aperture in said member and when so registering to prevent lateral and circumferential displacement of such rim-ends; and a latch movably attached to such other rim-end adapted in one position to engage directly with such first rim-end to prevent radial displacement thereof.

6. A device of the character described, comprising a transversely split rim; an apertured member projecting beyond one end of said rim so as to over-lie the other end thereof, the aperture in such member extending across the split between the rim-ends; and a lug on such other rim-end adapted to register with such aperture, said lug including a fixed portion adapted to engage the end and side walls of such aperture, and a movable portion adapted in one position to overlie such other rim-end.

7. A device of the character described, comprising a transversely split-rim; an apertured member projecting beyond one end of said rim so as to overlie the other end thereof, the aperture in such member extending across the split between the rim-ends; and a lug on such other rim-end adapted to register with such aperture, said lug including a fixed portion adapted to engage the end and side walls of such aperture, and a pivotal disk having a portion cut away so as to be adapted in one position to overlie, and in another position to clear, such other rim-end.

Signed by me, this 27th day of March, 1917.

JOHN C. MANTERNACH.